United States Patent
Varney et al.

(10) Patent No.: US 10,837,314 B2
(45) Date of Patent: Nov. 17, 2020

(54) HOT SECTION DUAL WALL COMPONENT ANTI-BLOCKAGE SYSTEM

(71) Applicant: Rolls-Royce Corporation, Indianapolis, IN (US)

(72) Inventors: Bruce E. Varney, Greenwood, IN (US); Brett Barker, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 251 days.

(21) Appl. No.: 16/028,623

(22) Filed: Jul. 6, 2018

(65) Prior Publication Data
US 2020/0011199 A1    Jan. 9, 2020

(51) Int. Cl.
*F01D 25/12*      (2006.01)

(52) U.S. Cl.
CPC ........ *F01D 25/12* (2013.01); *F05D 2220/323* (2013.01); *F05D 2240/35* (2013.01); *F05D 2250/232* (2013.01); *F05D 2250/71* (2013.01); *F05D 2260/201* (2013.01)

(58) Field of Classification Search
CPC .. F01D 25/12; F23R 3/002; F23R 3/04; F23R 2900/03044; F05D 2260/201
See application file for complete search history.

(56) References Cited

U.S. PATENT DOCUMENTS

| | | | |
|---|---|---|---|
| 5,353,865 A * | 10/1994 | Adiutori | F28F 13/02 165/109.1 |
| 5,468,125 A | 11/1995 | Okpara et al. | |
| 6,142,734 A | 11/2000 | Lee | |
| 6,406,260 B1 | 6/2002 | Trindade et al. | |
| 6,688,110 B2 | 2/2004 | Dailey et al. | |
| 8,348,613 B2 | 1/2013 | Gregg et al. | |
| 2002/0062945 A1* | 5/2002 | Hocker | F01D 5/189 165/53 |
| 2013/0205794 A1 | 8/2013 | Xu | |
| 2016/0238249 A1* | 8/2016 | Cunha | F23R 3/005 |
| 2017/0191417 A1* | 7/2017 | Bunker | F01D 25/12 |

FOREIGN PATENT DOCUMENTS

EP          2700877 A2 *   8/2013  ............... F02C 7/18

* cited by examiner

*Primary Examiner* — Steven M Sutherland
(74) *Attorney, Agent, or Firm* — Brinks Gilson & Lione

(57) ABSTRACT

A system for a hot section dual wall component in a gas turbine engine is used to avoid blockage by minimizing particulate deposits. The system includes impingement apertures formed in first wall of a cooling passageway of the dual wall component, and posts included on a second wall of the cooling passageway. The impingement apertures and the posts are respectively aligned opposite each other in the cooling passageway in operative cooperation so that working fluid exhausting into the cooling passageway from the impingement apertures in a first direction is directed to flow in a second direction along the cooling passageway to provide a laminar flow of the working fluid through the cooling passageway in order to minimize deposition of particles.

11 Claims, 6 Drawing Sheets

HOT SECTION DUAL WALL COMPONENT ANTI-BLOCKAGE SYSTEM

TECHNICAL FIELD

This disclosure relates to gas turbine engines and, in particular, to a hot section dual wall component anti-blockage system for gas turbine engines.

BACKGROUND

Gas turbine engines may include a compressor, a combustor and a turbine. Typically, the compressor is an air compressor rotating on a shaft of the engine to provide air for the combustion cycle. The compressor and the turbine may include blades. The blades (and other parts) of the turbine may be subject to relatively high temperatures, such as from exhaust gas discharged by the combustor. In some gas turbines, cooling air may be used to cool parts of the turbine such as the blades. Such cooling air may be supplied from the compressor, from another part of the gas turbine engine, or from an air supply external to the gas turbine engine.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
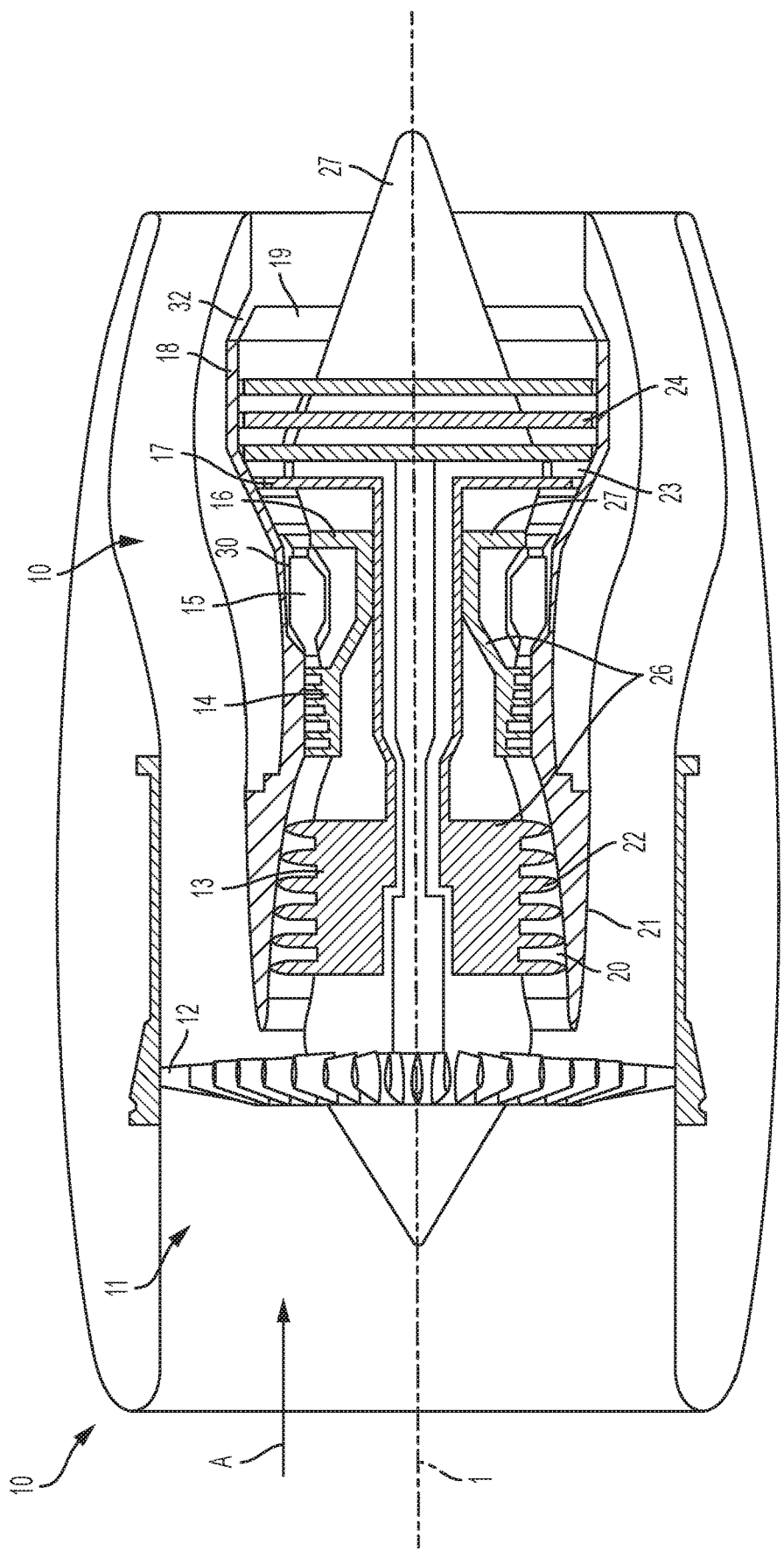
FIG. 1 illustrates a cross-sectional view of an example of a gas turbine engine.

By way of an introductory example, the anti-blockage system as described herein includes a hot section component of a gas turbine. The hot section component includes a dual wall having a first wall and a second wall that are adjacently disposed to define a cooling passageway therebetween. The first wall may be formed to include a series of impingement apertures providing fluid communication between the cooling passageway and a source of cooling fluid external to the cooling passageway. A series of posts may each extend from the second wall toward a respective one of the series of impingement apertures. The posts may be sized and positioned to receive and direct a flow of fluid into the cooling passageway.

One interesting feature of the systems and methods described below may be that each of the posts are positioned opposite a respective impingement aperture such that working fluid flowing through the impingement apertures is re-directed to flow with a unitary laminar flow in the cooling passageway. Thus, deposit of particulate included in the flow of working fluid within the passageway are minimized.

Alternatively, or in addition, an interesting feature of the systems and methods described below may be that the posts are tapered between a base of the posts and a tip of the posts in order to transition a laminar flow of working fluid from a first direction at the discharge of the impingement aperture to a second direction flowing along the cooling passageway so as to minimize particulate release from the flow of working fluid.

Alternatively, or in addition, an interesting feature of the systems and methods described below may be that the posts are aligned with respect to the impingement apertures such that a tip of the post is axially aligned with the impingement apertures.

Alternatively, or in addition, an interesting feature of the systems and methods described below may be that each of the posts include a sidewall extending between a base and a tip of each of the posts. The sidewall may be a planar surface or a curved surface having a predetermined radius of curvature such that the working fluid flows with laminar flow tangentially along the planar surface or the curved surface to transition from the first direction at the outlet of the impingement aperture to the second direction flowing along the passageway.

Alternatively, or in addition, an interesting feature of the systems and methods described below may be that a shape of each of the posts is a cone, a polyhedron, a half sphere or a ramp positioned on the inner wall opposite a respective impingement aperture included in the outer wall.

Disclosed herein are examples of an anti-blockage system and method for hot section dual wall components for gas turbine engines and methods of manufacturing the same that may be used in any industry, such as, for example, to power aircraft, watercraft, power generators, and the like. The components have improved cooling configurations such that the components may be operated for an extended period with minimized reduction in cooling efficiency so as to withstand high temperature environments that may exceed 1370 degrees Celsius, or about 2,500 degrees Fahrenheit.

Gas turbine engines of the axial flow type include a hot section, such as higher pressure regions of the gas turbine. The hot section may include components such as combustors, turbine(s), and exhaust nozzles. Combustors may include components such as combustor liners, and exhaust nozzles may include exhaust nozzles, exhaust liners. The turbine(s) may include components such as one or more axially alternate annular arrays of radially extending stator airfoil vanes and rotary airfoil blades. The demands of modern gas turbine engines may require that the gases that flow through, and thereby drive, the turbine are at extremely high temperature. As the gases flow through the combustors, turbine(s) and exhaust nozzles, the temperature of the gases progressively falls. However, notwithstanding this, the gas temperatures in the hot section may be so high that some form of cooling of the components in the hot section may be required.

Components in the hot section such as liners, turbine seals and turbine airfoils (which includes both blades and vanes) may be cooled internally with a gas or a liquid (a fluid), such as air, that has been tapped from the gas turbine engine's compressor. Methods of cooling may include convection cooling and film cooling. Convection cooling generally refers to a technique of transferring heat from a surface of an object to the environment by the movement of matter, for example, cooling internal surfaces of the component (e.g., liner, seal or airfoil) by directing a steady flow of pressurized cooling media through a network of internal passageways of the component. The pressurized cooling media may enter the passageways via cooler inlet holes and exiting through hotter exit holes. This may provide for convective heat transfer from the walls of the component to the cooling media.

Accordingly, the design of hot section components such as liners, seals and airfoils may include internal channels for the flow of fluid such as cooling air as the cooling media. Such channels may provide convection cooling such that cooling fluid is drawn from a hollow liner, seal or airfoil interior (e.g., reservoir of cooled air) and through small inlet holes into the channels (e.g., radially extending passages or impingement holes) where the cooling fluid may absorb heat from the surfaces of the channels. Some of the cooling fluid, such as air, may be exhausted through small exit holes that provide fluid communication between the channels and the liner, seal or airfoil external surface. As the air is exhausted from the holes, it may form a film on the liner or airfoil external surface that provides additional airfoil cooling via film cooling.

Film cooling generally refers to a technique of cooling an external surface of the component (e.g., liner, seal or airfoil) that is being heated by the high temperature gas, and may involve directing a flow of relatively cool media, such as air, along the component's external surface. The cooling media may function as an insulating layer to reduce the unwanted heating of the external surface of the component by the flow of high temperature gas.

FIG. 1 illustrates a gas turbine engine 10 which may include a compressor, a combustor, and a power turbine. The three components may be integrated together to produce a flight propulsion engine. In some examples, the gas turbine engine 10 may supply power to and/or provide propulsion of an aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle. Alternatively or in addition, the gas turbine engine 10 may be utilized in a configuration unrelated to an aircraft such as, for example, an industrial application, an energy application, a power plant, a pumping set, a marine application (for example, for naval propulsion), a weapon system, a security system, a perimeter defense or security system.

The gas turbine engine 10 may take a variety of forms in various embodiments. Though depicted as an axial flow engine, in some forms the gas turbine engine 10 may have multiple spools and/or may be a centrifugal or mixed centrifugal/axial flow engine. In some forms, the gas turbine engine 10 may be a turboprop, a turbofan, or a turboshaft engine. Furthermore, the gas turbine engine 10 may be an adaptive cycle and/or variable cycle engine. Other variations are also contemplated.

The engine 10 may include, in the flow direction identified with arrow "A,", an air inlet 11, a fan 12 rotating inside a casing, an intermediate-pressure compressor 13, a high-pressure compressor 14, a combustion chamber 15, a high-pressure turbine 16, an intermediate-pressure turbine 17 and a low-pressure turbine 18 as well as an exhaust nozzle 19, all of which being arranged about a center engine axis 1. In other example configurations some components may be modified or omitted. For example there may be fewer or greater numbers of pressure turbines (14, 16, 18). Depending on configuration, additional compressors and turbines may be added with intercoolers connecting between the compressors and reheat combustion chambers may be added between the turbines.

The intermediate-pressure compressor 13 and the high-pressure compressor 14 may each include several stages, of which each has an arrangement extending in the circumferential direction of fixed and stationary guide vanes 20, generally referred to as stator vanes and projecting radially inwards from the engine casing 21 in an annular flow duct through the compressors 13 and 14. The compressors furthermore may have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17 and 18 may have hot section components such as turbine seals, an arrangement of fixed stator vanes 23 projecting radially inwards from the casing 21 into the annular flow duct through the turbines 16, 17, and 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon, may rotate about the engine axis 1 during operation.

The stationary guide vanes 20, compressor rotor blades 22, fixed stator vanes 23, and turbine blades 24 may collectively be referred to as airfoils 100 (see FIG. 2), and hereinafter this application will refer to blades and/or vanes as airfoils 100, unless specifically stated otherwise in the text. As discussed herein, at least a portion of the airfoils 100 may be hot section components having a dual-wall cooling configuration to improve the cooling.

The combustion chamber 15 may include hot section components such as a combustion liner 30. The combustion liner 30 may form one or more interior walls, channels, dividers, or passageways within the combustion chamber 15 that are subject to high heat from the hot combustion gasses. The exhaust nozzle 19 may include hot section components such as an exhaust liner 32. The exhaust liner 32 may form one or more interior walls, channels, dividers, or passageways within the exhaust nozzle 19 that are subject to high heat from the hot combustion gasses exiting the turbine(s). All or portions of the combustion liner 30 and exhaust liner 32 as well as domes, burner seals, aft seals, and combustor tiles may be hot section components that include a dual-wall cooling configuration to improve cooling.

Other products utilizing the present concepts are contemplated herein including but not limited to airframe wing leading edges, and/or other actively cooled components.

In examples, the gas turbine engine hot section components, such as liners, seals and airfoils are formed of a heat resistant superalloy composition. There are various types of superalloy compositions, such as but not limited to nickel based or cobalt based compositions. Most superalloy compositions of interest are complicated mixtures of nickel, chromium, aluminum and other select elements. The hot section components, such as liners and airfoils may be of a unitary cast configuration, and/or an assembly of cast components, and/or an assembly of cast and wrought components. For example, the airfoils may have an equiax, directionally solidified or a single crystal alloy structure. In an example, the gas turbine engine airfoils are of a cast single crystal single structure. In other examples, the products are formed of a metallic material, or an intermetallic material or a ceramic material. In still other examples, hot section components may be produced by additive layer machining (ALM), mechanical milling, or electro-chemical machining (ECM) including precision ECM (pECM). Production of hot section components may also involve a secondary operation such as ALM or ECM/pECM applied to a surface produced by other means. The hot section components may also include a thermal barrier coating (TBC), which may provide a heat resistant layer for materials included in the hot section component. The features of the examples illustrated and described with respect to FIG. 1 may be included as, or combined with, features in any other examples described herein.

Figure 2:
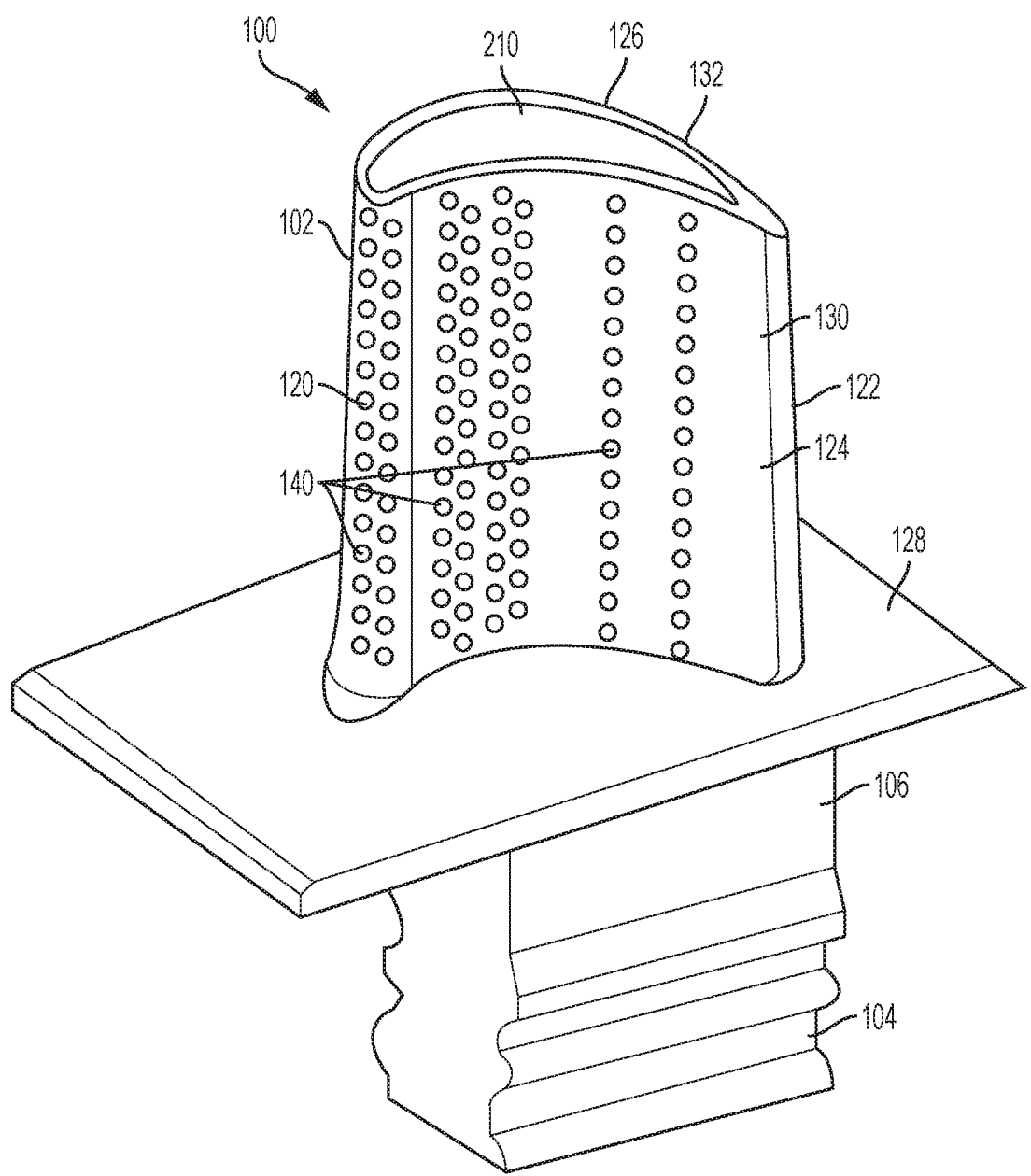
FIG. 2 illustrates a perspective view of an example hot section component.

FIG. 2 illustrates a perspective view of an example hot section component. In FIG. 2, the example hot section component is a dual wall airfoil 100 of a gas turbine engine 10. In other examples, the hot section component may be combustion liners, turbine seals and other parts of the gas turbine using a dual wall structure for cooling, and the example of FIG. 2 should not be construed as limiting in any way.

The airfoil 100 may have as principal regions an airfoil portion 102, a root portion 104, and a shank portion 106 extending between the airfoil portion 102 and the root portion 104. The shank portion 106 may have a central conduit (not shown) formed therein which is in fluid communication with a hollow cavity/passageway 210 within the airfoil 100. The hollow cavity 210 may function as an internal passageway for receiving cooling media from the compressor and distributing it within the airfoil 100. The cooling media may be a compressible fluid such as air.

The airfoil 100 may have a leading edge 120, a trailing edge 122, and an outer surface 124 extending therebetween. Hereinafter, the term spanwise will indicate an orientation between a tip 126 and a platform 128; and the term streamwise will indicate an orientation between the leading edge 120 and the trailing edge 122. The leading edge 120 may face in an upstream direction with respect to the approaching fluid flow and the trailing edge 122 may face in a downstream direction. The airfoil 100 may include a concave pressure side 130 and an opposite convex suction side 132. Arranged along the outer surface 124 of the airfoil 100 may be a plurality of cooling media exit holes 140 that may allow for the discharge of cooling media across the outer surface 124.

One example of the cooling scheme includes a plurality of cooling media exit holes 140 (e.g., a plurality of angled (oblique) film holes and/or a plurality of orthogonal holes) along the outer surface 124 of the pressure side 130. The suction side 132 may also have a plurality of exit holes (not shown). The exit holes 140 may be arranged in a closely-spaced array to help compensate for the heat load on the airfoil 100 related to the high temperature working fluid flowing thereover. It is understood that the airfoil 100 illustrated in FIG. 2 is not intended to be limiting and other airfoil and airfoil cooling designs are contemplated herein. For example, the location, size, and quantity of cooling media inlet opening and exit openings may be different based on the design parameters of a specific application. The features of the examples illustrated and described with respect to FIG. 2 may be included as, or combined with, features in any other examples described herein.

Figure 3:
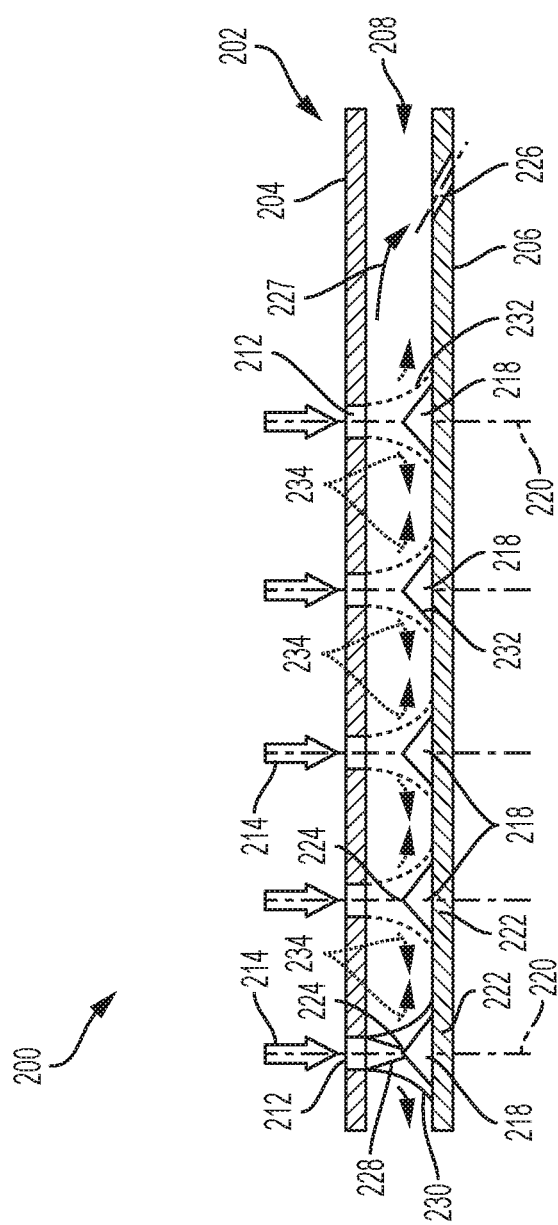
FIG. 3 is a cross sectional view of an example of a portion of a hot section component.

FIG. 3 is a cross sectional view of an example of a portion of a hot section component 200. The hot section component 200, such as a liner, a seal or an airfoil, includes a dual wall 202. The dual wall 202 includes an outer wall 204, or first wall, and an inner wall 206, or second wall that are disposed adjacently to form cooling passageway 208. The outer wall 204 may include a series of impingement apertures 212 formed therein to receive a working fluid, such as compressed air from the compressor as impingement jets 214. The impingement apertures 212 may form a conduit for the flow of the working fluid through the outer wall to the cooling passageway 208. The impingement apertures 212 may penetrate the outer wall 204 orthogonal to a surface of the outer wall 204, as illustrated, or may obliquely penetrate the outer wall 204 at a predetermined angle with respect to the surface of the outer wall 204, such as in a range of forty-five to ninety degrees.

The impingement apertures 212 may be sequentially spaced a predetermined distance apart to form an impingement aperture pattern. A predetermined diameter of the impingement apertures 212 may be adequate to provide fluid communication between the cooling passageway 208 and the source of working fluid, such as the compressor, which is external to the cooling passageway 208. In examples, a diameter of the impingement apertures 212 may be in a range of less than five millimeters. The diameter of each of the impingement apertures 212 may be equal, or the diameters may vary in accordance with location, anticipated temperature of the hot section component in which the impingement aperture 212 is present, the topology of the hot section component, or any other criteria or condition that warrants different flow rates in different areas of the hot section component.

The inner wall 206 may be formed to include a series of posts 218 sequentially spaced a predetermined distance apart to form a post pattern. Each of the posts 218 extend from a surface of the inner wall 206 toward a respective outlet of a respective impingement aperture 212. The posts 218 are formed to include a diminishing cross sectional area as the post 218 extends away from the inner wall 206. A proximate end of each of the posts 218 forms a base 222 of the respective post 218. The base 222 may be included on the inner wall 206 by being coupled with, or being formed as part of, the inner wall 206. A distal end of the posts 218 forms a tip 224 of the respective posts 218. The tip 224 of each of the posts may be positioned to align the post 218 with a respective one of the impingement apertures 212. For example, the tip 224 may be axially positioned in alignment with a respective one of the impingement apertures 212. Accordingly, each of the posts 218 may be aligned with a respective impingement aperture 212 such that the impingement aperture pattern matches the post pattern.

During operation, the impingement jets 214 consisting of working fluid in the form of cooling media may exit the respective impingement holes 212 as a flow of cooling media that includes a core region 228 and a shoulder region 230 or mixing region. In an example, the core region 228 may impact the tip 224 and the shoulder region 230 may impact a sidewall 232 of the posts 218 forming the tapered portion of the posts 218 between the tip 224 and the base 222. In another example, both the core region 228 and the shoulder region 230 may impact the sidewall 232. The tips 224 and the sidewall 232 providing the tapered geometry of the posts 218 re-direct the core region 228 and the shoulder region 230 of the working fluid as illustrated by arrows 234 such that the flow of cooling media is a laminar unitary flow within the passageway 208 to maintain particles within the working fluid. The flow of cooling media may exit the impingement aperture 218 flowing in a first direction and be directed by the posts 218 to uniformly flow in at least a second direction within the passageway 208 while minimizing accumulation of deposits of particles in the passageway 208. Thus, the laminar unitary flow may operate as a carrier or vehicle for particulate that may be present.

Gas turbine engines are often subject to environmental particulates (e.g. sand, dust, dirt) which are ingested into the engine. These particulates can then enter the core hot gas path and cooling circuits. In addition, domestic particulates (e.g. compressor abradable material) can also enter into cooling circuits.

In the hot section, particulates may interact with hot section components. For example, particulates may be deposited on surfaces in the path of the exhaust gasses path within the hot section. Such particulates may result in reduction in gas turbine capacity when deposited on turbine components, such as by reducing high pressure turbine (HPT) nozzle area. In addition or alternatively, such particulate deposition may result in blockage of cooling holes on the exhaust gasses path side, adhesion to Thermal Barrier Coating (TBC) resulting in damage to and loss of the coating, and/or blockage in the cooling circuit. Blockage in the cooling circuit may include blockage of cooling holes from the cold side and/or internal cooling feature blockage for multi-walled structures. Any of these effects can result in distress to hot section components, leading to early removal of the engine. This reduced on-wing time results in significant disruption to carriers, and (given the current trend for operators to pay for on-wing time) increased cost to the original equipment manufacturer (OEM).

In addition to the previously discussed reasons for particulate accumulation, in the hot gas path, soft or molten particulates may accumulate on the hot surface of hot section components, which is called liquid bridging. There are options for reducing build-up of particles on the hot side and for protecting holes from blockage when particles do accumulate. In the internal flow circuits of dual wall hot section system components, however, the accumulation of very fine particles happens by a different mechanism; very small particles which are not molten or softened can accumulate at the entrance to film or impingement cooling holes, blocking the holes from the inside—within the passageway 208. The result is a reduction in film or impingement cooling air, leading to increased component temperatures, which may exacerbate external accumulation and also lead to oxidation and/or thermos-mechanical fatigue failure of the component.

In hot section components with dual wall arrangements, particulate accumulation may occur as deposits formed in the passageway 208 between the inner and outer walls 204 and 206. These deposits can fill up the space in the passageway 208, blocking off impingement holes, or can later detach from the surface of the passageway 208 and lead to blockage in other areas of the cooling system. Mitigation of such blockage may involve placing a lower bound on the size of cooling holes and passages to ensure that any build-up will take a long time to fill the passage and result in flow blockage. However, cooling systems are more efficient with a larger number of smaller holes, and this effect is particularly strong for advanced impingement-film cooling systems. The lower bound on cooling hole/passage size results in a less efficient cooling system, leading to greater consumption of cooling air. This in turn leads to a less efficient overall engine cycle and increased losses from mixing of the cooling air with the main gas path. The features of the examples illustrated and described with respect to FIG. 2 may be included as, or combined with, features in any other examples described herein.

As illustrated in the example dual wall arrangement depicted in FIG. 3, The posts 218 may be positioned in the passageway 208 to cooperatively operate with the impingement apertures 212 to minimize buildup of deposits formed by particulate accumulation without relying on cooling hole size. Instead, cooperative operation is based on the positional relationship of the posts 218 and the impingement apertures 212 and the tapered geometry of the posts 218 with respect to the impingement apertures 212. The positional relationship is accomplished by each of the posts 218 being formed, or coupled to, the inner wall 206 opposite the location where a respective one of the impingement apertures 212 is formed in the outer wall 204. The tapered geometry of the posts 218 provides adjustment of the vector field flow direction of the working fluid as the working fluid exits the impingement apertures 212, enters the passageway 208 and is transitioned to flow along the passageway 208 as illustrated by arrows 234. Vector fields may represent or model the speed and direction of the moving working fluid through space with regard to strength and direction of the velocity of the working fluid. Thus, the tapered geometry of the posts 218 may maintain an organized continuous laminar flow of the vector field during the transition to encourage particulate to remain in motion within the flow.

Management of the vector field created by the flow of working fluid may minimize the buildup of deposits in the passageway 208. Without the posts 218 being present, build-up of particle deposits in the passageway 208 may occur due to particles getting entrained in a low velocity dead zone at a center of the impingement jets 214 near an impingement surface of the inner wall 206 opposite the impingement holes (the impingement surface). The adhesion energy of the particles may be higher than the energy available for rebound such that particles in the flow of working fluid cannot overcome the adhesive forces between the inner wall 206 and the particles resulting in formation of deposits on the inner wall 206.

Due to the presence of the posts 218, the particles may be redirected within the vector field flow of the working fluid to avoid normal impingement on the inner wall 206 and resulting adhesion. The placement and tapered geometry of the posts 218 avoids the presence of such low velocity flow region(s) (stagnation zone(s)) in the impingement area, which reduces the likelihood that these particles will be removed from the flow of working fluid due to fluid shear. In addition, particles which would otherwise be entrained in the stagnation zone may be redirected due to the posts 218 to avoid hitting the inner wall 206 at such low velocities that their rebound energy cannot overcome adhesive forces between the inner wall 206 and the particles.

The posts 218 may be any tapered shape having a base 222 and an apex represented by a tip 224 that creates a vector field flow capable of redirecting the particles. The apex formed by the tip 224 may be centered over the base 222. Alternatively, the apex formed by the tip 224 may be oblique with respect to the base 222. In the example configuration illustrated in FIG. 3, the posts 218 are illustrated as including a cone shaped structure, with the apex 224 centered over the base 222 to form a right cone. In other examples, where the apex 224 is not centered over the base 222, the posts 218 may include an oblique cone. In other examples, the posts 218 may be formed to include other shapes providing a base and an apex. For example, the posts 218 may be oblique or right polyhedrons, such as pyramids; or oblique or right domes, such as a half sphere. In still other examples, the posts 218 may be a ramp structure, triangular or other shapes capable of redirecting or transitioning the flow of working fluid into the passageway 208.

In the example of FIG. 3, a central axis 220 is the common to the post 218 and the impingement aperture 212 such that the post 218 and the impingement aperture 212 are axially aligned. A base 222 of the posts 218 may be coupled with, or formed as part of, the inner wall 206, and a tip 224 of each of the posts 218 projects away from the respective base 222 toward a respective impingement aperture 212. Each of the posts 218 may be tapered between the tip 224 and the base 222 such that the tip 224 forms an apex or vertex with a cross-sectional area that is smaller than the base 222. In the example of a polyhedron, the base 222 may be a polygon shape, such as a square shape, a rectangular shape, or a triangular shape, whereas in the example of a cone, the base 222 may be a circular shape.

Figure 4:
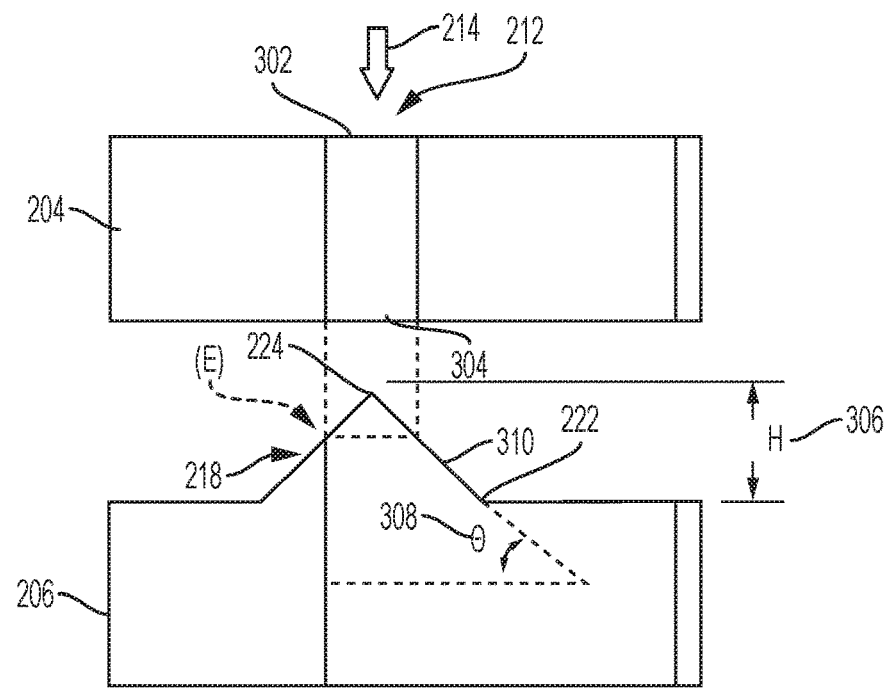
FIG. 4 is a cut-away elevation view of an example impingement aperture and an example post within a hot section component.

FIG. 4 is a cut-away elevation view of an example impingement aperture 212 and an example post 218 within a hot section component. The post 218 may be positioned and aligned in the passageway 208 to cooperatively operate with the impingement aperture 212 to direct a flow of working fluid. The flow of working fluid may be directed to change direction from a first direction where the working fluid is flowing along a central axis of the impingement aperture 212 to a second direction along the outer and inner walls 204 and 206. The impingement aperture 212 may include an inlet 302, which receives the impingement jets 214 as the working fluid, and an outlet 304 supplying the working fluid to the passageway 208. The post 218 may extend above the inner wall 206 a predetermined height (H) 306 to the tip 224 located at a distal end of the post 218. The predetermined height (H) 306 may be thirty to sixty percent of the distance between the outer wall 204 and the inner wall 206. The taper of the post 218 may be a predetermined radius of curvature or a predetermined angle (Θ). In the example of FIG. 4, the predetermined angle (Θ) may be in a range of ten to forty-five degrees. In an example, the height (H) 306 of the post 218 may be thirty percent of the distance between the outer wall 204 and the inner wall 206, and the predetermined angle (Θ) may be ten degrees. In another example, the height (H) 306 of the post 218 may be fifty percent of the distance between the outer wall 204 and the inner wall 206, and the predetermined angle (Θ) may be thirty degrees. In still another example, the height (H) 306 of the post 218 may be sixty percent of the distance between the outer wall 204 and the inner wall 206, and the predetermined angle (Θ) may be forty five degrees. The features of the examples illustrated and described with respect to FIG. 4 may be included as, or combined with, features in any other examples described herein.

Figure 5:
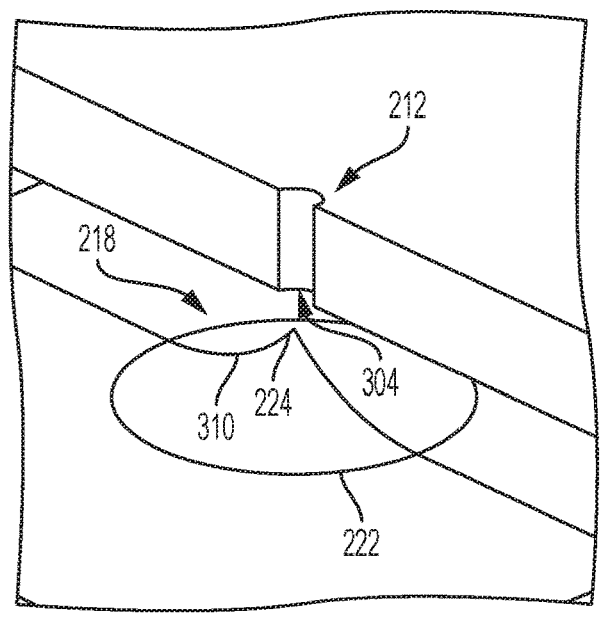
FIG. 5 is a cutaway perspective view of another example impingement aperture and another example post within a hot section component.

FIG. 5 is a cutaway perspective view of another example impingement aperture 212 aligned to cooperative operate with an example post 218 within a hot section component. As illustrated in FIGS. 4 and 5, a cross sectional area of the tip 224 at a distal end of the post 218 is less than a cross-sectional area of the outlet 304 of the impingement aperture 212. In addition, a cross-sectional area of the base 222 at a proximate end of the post 218 is larger than the cross-sectional area of the outlet 304. Due to the post 218 being tapered, at a vertical height of the post 218 between the base 222 and the tip 224, the cross-sectional area of the outlet 304 and the cross-sectional area of the post 218 may be equal at a point illustrated as (E) in FIG. 4.

Sidewalls 310 of the posts 218 extending between the base 222 and the tip 224 may be planar surfaces forming the tapered body of the posts 218 between the tip 224 and the base 222 as illustrated in FIG. 4. Alternatively, or in addition, The sidewalls 310 may be formed with a predetermined radius of curvature. FIG. 5 illustrates a post 218 formed as a right cone with an example of a convex predetermined radius of curvature. In other example shapes, such as post 218 that is a dome, the predetermined radius of curvature may be convex, concave, or a combination of both convex and concave. The predetermined radius of curvature may be chosen to minimize flow stagnation areas in the passageway 208 such that particulate included in the flow of working fluid remains suspended in the flow of working fluid as the flow of working fluid transitions to flowing in the passageway 208. Working fluid exiting the outlet 304 of the impingement aperture 212 flows tangentially along the sidewall 310 so as to be redirected from flowing in a first direction upon leaving the outlet 304 to flowing in a second direction in the passageway 208. The features of the examples illustrated and described with respect to FIG. 5 may be included as, or combined with, features in any other examples described herein.

Figure 6:
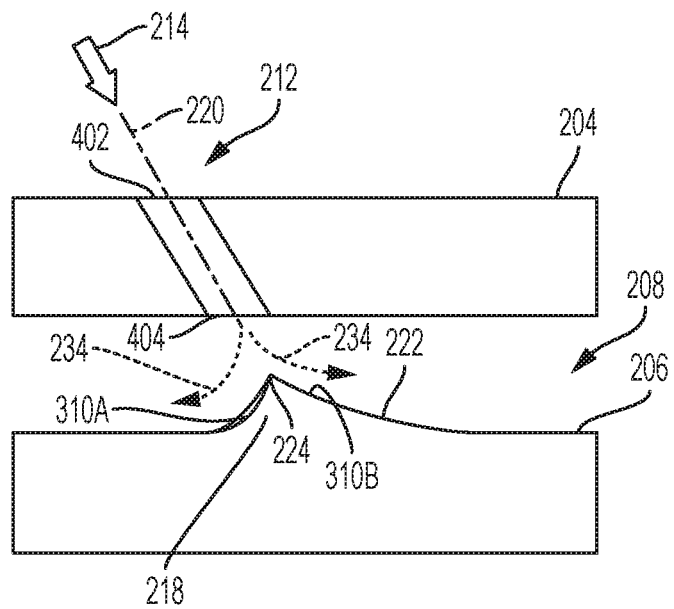
FIG. 6 is a cutaway elevation view of another example impingement aperture and another example post in a hot section component.

FIG. 6 is a cutaway elevation view of an example impingement aperture 212 situated to cooperatively operate with an example post 218 in a hot section component. In FIG. 6, the example, impingement aperture 212 may form a conduit for the flow of the working fluid that obliquely penetrates the outer wall 204 to provide fluid communication with the cooling passageway 208. The impingement apertures 212 penetrate the outer wall 204 at a predetermined angle to a surface of the outer wall 204, as illustrated, such that an inlet 402 and an outlet 404 of the impingement apertures are elliptical. The predetermined angle formed between a central axis of the impingement aperture 212 and the surface of the outer wall 204 may be in a range between forty-five and ninety degrees.

The post 218 in the example of FIG. 6, may be an oblique polyhedron since the tip 224 at a distal end of the post 218 is not centered above the base 222 at a proximate end of the post 218. In other examples, other oblique shapes may be used. The post 218 in this example may cooperatively operate with the impingement aperture 212 to maintain a laminar flow of working fluid. The working fluid exits the impingement aperture 212 and flows tangentially along the sidewall 310 in order to transition from flowing with laminar flow in a first direction through the impingement aperture 212 to flowing with laminar flow in a second direction within the passageway 208. Since the post 218 is positioned opposite the impingement aperture 212, particulate entering the passageway 208 may remain suspended in the flow of working fluid being transitioned with laminar flow from the impingement aperture 212 to flowing in the passageway 208.

The sidewalls 310 of the post 218 may be planar surfaces, or may be formed with a radius of curvature. Since the post 218 is oblique (apex of the tip 224 is not over the midpoint of the base 222), the predetermined radius of curvature of the sidewalls 310 may be different to accommodate the flow of working fluid on opposite sides of the post 218. Thus, a first predetermined radius of curvature on a first sidewall 310A of the post 218 may be different from a second predetermined radius of curvature on a second sidewall 310B. In examples where the sidewalls are planar surfaces without a predetermined radius of curvature, a length of the first side wall 310A may be less than a length of the second sidewall 310B. Accordingly, the taper of the first sidewall 310A between the tip 224 and the base 222 may be different than the taper of the second sidewall 310B.

The tip 224 of the post 218 may project away from the base 222 to align with the central axis 220 of the impingement aperture 212. Accordingly, the flow of working fluid may be transitioned to have laminar flow in different directions, such as opposite directions, within the passageway 208. Thus, the flow of working fluid in one direction may be directed by the first sidewall 310A and the flow of working fluid in another direction may be directed by the second sidewall 310B. The features of the examples illustrated and described with respect to FIG. 6 may be included as, or combined with, features in any other examples described herein.

Figure 7:
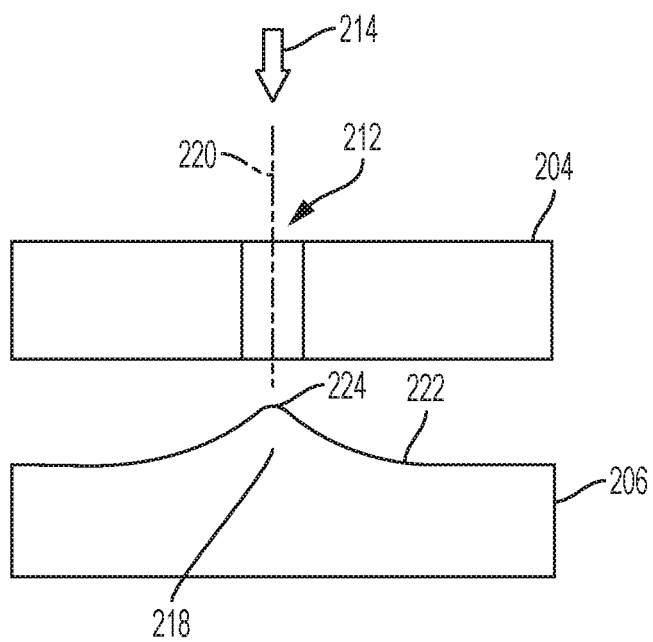
FIG. 7 is a cutaway elevation view of another example impingement aperture and another example post in a hot section component.

FIG. 7 is a cutaway elevation view of an example impingement aperture 212 aligned to cooperatively operate with an example post 218 in a hot section component. In FIG. 7, the post 218 is positioned opposite the impingement aperture 212 such that the tip 224 at the distal end extends away from the base 222 at the proximate end to align with the central axis 220. The tip 224 is formed with a smoothed apex having a predetermined radius of curvature. The predetermined radius of curvature may be in a range of 0 to 0.2 millimeters to provide transition of the flow of working fluid to laminar flow in the passageway 208 in different directions. In the example illustrated in FIG. 7, since the central axis of the impingement aperture 212 is normal to the surface of the outer wall 204, the first and second sidewalls 310A and 310B may have an equal radius of curvature, or may have planar surfaces, such as flat planar surfaces, of equal length. The features of the examples illustrated and described with respect to FIG. 7 may be included as, or combined with, features in any other examples described herein.

Figure 8:
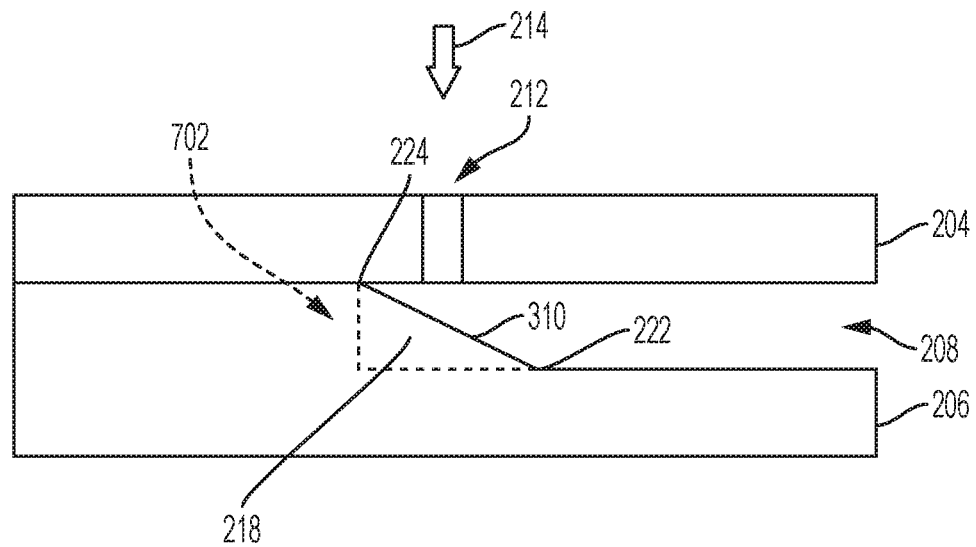
FIG. 8 is a cutaway elevation view of another example impingement aperture aligned to cooperatively operate with an example post in a hot section component to direct a flow of working fluid.

FIG. 8 is a cutaway elevation view of an example impingement aperture 212 aligned to cooperatively operate with an example post 218 in a hot section component to direct a flow of working fluid. In the illustrated example, the impingement aperture 212 is formed as a conduit in the outer wall 204 that is axially aligned orthogonal to the surface of the outer wall 204 such that the impingement jets 214 flow through the impingement aperture 212 and into the passageway orthogonal to the surface of the outer wall 204. In other examples, the impingement aperture 212 may axially align obliquely with the surface of the outer wall 204 at a predetermined angle in a range of forty-five to ninety degrees, and the impingement jets 214 may flow at a corresponding angle into the passageway 208. In this example, the impingement aperture 212 is in fluid communication with the passageway 208 at an end 702 of the passageway 208.

The post 218 may be included on the second wall 206 opposite the impingement aperture 212. In this example, since the post 218 is at the end 702 of the passageway 208, the tip 224, at a distal end of the post 218, may abut the inner surface of the outer wall 204 and the base 222, at a proximate end of the post 218, may abut the inner wall 206. In addition, a tapered surface 310A of the post 218 may be positioned opposite the impingement aperture 212 at a predetermined angle that is oblique with respect to the surface of the inner wall 206 and the outer wall 204 thereby forming the post 218 as a ramp to minimize deposit of particulate in the passageway 208 by changing direction of the flow of working fluid from a first direction to a second direction. The post 218 may therefore form a ramp with the sidewall 310A extended toward the impingement aperture 208.

During operation, a flow of working fluid may discharge or exhaust from the impingement aperture 212 and impact the tapered side wall 310A to redirect the direction of the flow of working fluid to a direction along the inner and outer walls 204 and 206, such as substantially parallel with the inner and outer walls 204 and 206. Due to the tapered sidewall 310A of the post 218 being formed as a ramp, the flow of the working fluid through the passageway 208 is laminar. Accordingly, deposition of particulate in the passageway 208 is minimized.

Since the post 218 is positioned at the end 702 of the passageway 208, the shape of the post 218 may be an oblique shaped post, such as an oblique cone or an oblique polyhedron, which may also be referred to as a ramp. The oblique shaped post 218 includes a tip 224, a base 222, and the tapered sidewall 310A, in which the tip 224 is positioned above an outer perimeter edge of the base 222. A second tapered sidewall 310B of the oblique shaped post 218 is a planar surface that is orthogonal with respect to the inner and outer walls 204 and 206, whereas the first tapered sidewall 310A of the post 218 is formed as a planar surface that is oblique with respect to the inner and outer walls 204 and 206. The tapered sidewall 310A is positioned to cooperative operate with the impingement aperture 212 to direct the working fluid to transition with laminar flow from the first direction to flowing along the passageway 208 in the second direction, and thereby minimize deposit of particulate. The features of the examples illustrated and described with respect to FIG. 8 may be included as, or combined with, features in any other examples described herein.

Figure 9:
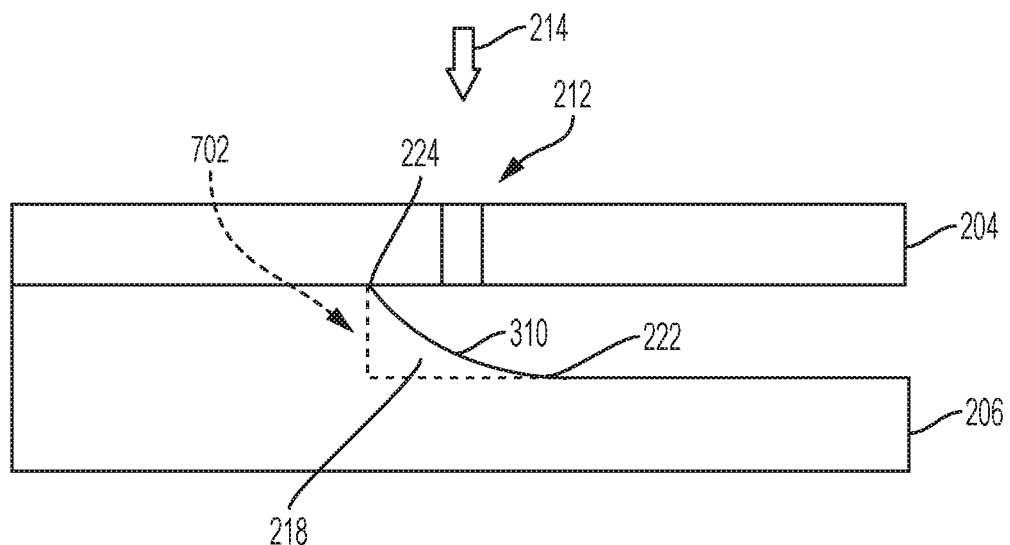
FIG. 9 is a cutaway elevation view of another example impingement aperture aligned to cooperatively operate with another example post in a hot section component to direct a flow of working fluid.

FIG. 9 is a cutaway elevation view of an example impingement aperture 212 aligned to cooperatively operate with an example post 218 in a hot section component to direct a flow of working fluid. In this example, the post 218 is in the shape of a ramp, with the tapered sidewall 310A formed with a predetermined radius of curvature to redirect the flow of working fluid to flow in the passageway 208. Since the post 218 is positioned opposite the impingement aperture 212, particulate entering the passageway 208 may remain suspended in the flow of working fluid being transitioned with laminar flow from flowing in a first direction through the impingement aperture 212 to flowing in the passageway 208 in a second direction. In the illustrated example, the impingement aperture 212 is formed as a conduit in the outer wall 204 that is axially aligned orthogonal to the surface of the outer wall 204 such that the impingement jets 214 flow through the impingement aperture 212 and into the passageway orthogonal to the surface of the outer wall 204. In other examples, the impingement aperture 212 may axially align obliquely with the surface of the outer wall 204 at a predetermined angle in a range of forty-five to ninety degrees, and the impingement jets 214 may enter the passageway 208 at a corresponding angle.

Transitioning from the first direction to the second direction occurs by the working fluid flowing tangentially along the radius of curvature of the sidewall 310A of the post 218 to the second direction flowing along the outer and inner walls 204 and 206 through the passageway 208. A second sidewall 310B may for a planar surface orthogonal to the upper and lower walls 204 and 206 due to the tip 224 being positioned above an outer perimeter edge of the base 222. The features of the examples illustrated and described with respect to FIG. 9 may be included as, or combined with, features in any other examples described herein.

Referring again to FIG. 3, dual wall hot section components may include wall structure in the passageway 208 having various configurations of cooling cavities of thin heat exchanger segments to permit heat transfer coefficients to be manipulated across different regions of the respective hot section component as the re-directed flow of the working fluid. The cavity configuration including the inflow and outflow orifices may be shaped, sized and include any number of pedestals, partitions, or diffusers to produce such varying heat transfer coefficient across the component's region. Such cavity configurations may be positioned adjacent to the cooperatively operable impingement apertures 212 and posts 218 and may be created during the initial forming process (e.g. casting or additive layer machining) or via a machining process (e.g. EDM, laser or waterjet machining). These features may be on the order of 10-50% of the height of the passageway 208. Another example of such features are "pin-fins", which span the entire height of the passageway 208 and provide further surface area for convective heat transfer in the cooling passageway 208. Ribs and dimples may also be employed as a means of increasing surface area affecting the cooling flow in such a way as to increase convective heat transfer. These features may be distributed throughout the passageway 208 adjacent to the cooperatively operable impingement apertures 212 and posts 218 and sufficiently spaced away so as to avoid negatively affect the cooperatively operation of the impingement apertures 212 and posts 218 in creating a laminar flow that minimizes particles forming deposits in the passageway 208.

The inner wall 206 may also be formed to include cooling apertures 226. The cooling apertures 226 may be cooling media exit holes providing egress for the flow of cooling media flowing in the passageway 208 as illustrated by arrow 227. The flow of cooling media may provide convection cooling by absorption of heat from the hot section component and/or provide film cooling of the surface of the hot section component. The cooling apertures 226 may be formed as oblique conduits through the surface of the inner wall 206 as illustrated in FIG. 3. Alternatively, or in addition, the cooling apertures 226 may be formed as conduits, which are normal or orthogonal to the surface of the inner wall 206.

With reference to FIGS. 1-9, a dual wall hot section component such as a combustion liner, turbine seal segment, turbine vane, turbine blade may include posts, such as a cone, polyhedron or a ramp positioned on the interior surface of the inner wall of the cooling passageway directly opposite impingement holes to reduce or eliminate the stagnation zone, and/or to change the angle of incidence of ballistic particles. There are a number of methods of producing dual wall hot section components with posts providing an impingement surface feature to reduce or eliminate deposits formed by particulate build up. The method may be, for example, a primary operation for forming the posts in the passageways. Examples of primary operations that could produce these features include casting, additive layer machining (ALM), mechanical milling, or electro-chemical machining (ECM) including precision ECM (pECM). The method may also be, for example, a secondary operation such as ALM or ECM/pECM applied to a surface produced by other means. Impingement walls forming the cooling passageway are typically produced in the initial casting of a dual wall hot section component, or are created using traditional machining processes (e.g. EDM, laser or waterjet). These methods typically result in a relatively smooth surface relative to the size of the features contemplated.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A system comprising:
   a hot section component of a gas turbine;
   a dual wall included in the hot section component, the dual wall including a first wall and a second wall, the first wall and the second wall disposed adjacently to define a cooling passageway therebetween;
   the first wall formed to include a series of impingement apertures providing fluid communication between the cooling passageway and a source of cooling fluid external to the cooling passageway; and
   a series of posts, each of the respective posts extending from the second wall toward a respective one of the series of impingement apertures, the posts sized and positioned to receive and direct a flow of fluid into the cooling passageway.

2. The system of aspect 1, wherein a cross-sectional area of a base of each of the posts is greater than a cross sectional area of a tip of each of the posts, the base coupled with second wall, and one of the tip and a sidewall of the post aligned with the respective one of the series of impingement apertures.

3. The system of aspect 2, wherein the sidewall is tapered between the tip and the base.

4. The system of aspect 3, wherein the sidewall is a planar surface between the tip and the base.

5. The system of aspect 3, wherein the sidewall is a curved surface between the tip and the base having a predetermined radius of curvature.

6. The system as in any of aspects 1-5, wherein each of the posts include a proximate end coupled with the second wall and a distal end axially positioned in alignment with a respective one of the impingement apertures.

7. The system as in any of aspects 1-6, wherein a shape of each of the posts is a cone, a polyhedron, a half sphere or a ramp positioned on the second wall opposite a respective impingement aperture included in the first wall.

8. The system as in any of aspects 1-7, wherein the series of impingement apertures are positioned in a first predetermined pattern, and the series of posts are positioned in a second predetermined pattern that matches the first predetermined pattern.

9. A system comprising:
    a dual wall cooling passageway of a hot section component of a gas turbine, the dual wall cooling passageway defined by a first wall and a second wall;
    an impingement aperture formed in the first wall of the dual wall cooling passageway; and
    a post included on the second wall of the dual wall cooling passageway;
    wherein the first wall is opposite the second wall and the post is aligned with the impingement aperture to extend from the second wall a predetermined distance toward the impingement aperture formed in the first wall;
    wherein the post is formed to include a diminishing cross sectional area as the post extends away from the second wall; and
    wherein the post is sized and positioned to transition a flow of fluid exiting the impingement aperture flowing in a first direction to flow in the dual wall cooling passageway in a second direction.

10. The system of aspect 9, wherein the post includes a tapered sidewall and is positioned in the dual wall cooling passageway so the tapered sidewall re-directs the flow of fluid exiting the impingement aperture.

11. The system as in aspect 9 or 10, wherein the post includes a tip, a base and a tapered sidewall positioned between the tip and the base.

12. The system of aspect 11, wherein the tapered sidewall is a planar surface.

13. The system of aspect 11, wherein the tapered sidewall is a curved surface having a predetermined radius of curvature.

14. The system as in any of aspects 9-13, wherein a central axis of the impingement aperture is common with a central axis of the post to align the impingement aperture with the post.

15. The system as in any of aspects 9-14, wherein the first direction is orthogonal to a surface of the first wall, and the second direction is along the surface of the first wall.

16. The system as in any of aspects 9-15, wherein the first direction is oblique with respect to a surface of the first wall, and the second direction is along the surface of the first wall.

17. A system comprising:
    a first wall formed to include a plurality of impingement apertures;
    a second wall that includes a plurality of posts; and
    a cooling passageway defined by the first wall and the second wall;
    the first wall aligned with the second wall such that each of the impingement apertures are positioned opposite one of respective posts;
    each of the posts extending away from the second wall into the cooling passageway toward the first wall to align a tapered portion of each of the posts with one of the respective impingement apertures, and the impingement apertures in fluid communication with the cooling passageway.

18. The system of aspect 17, wherein each of the posts are in fluid communication with a working fluid received from respective outlets of the impingement apertures and the tapered portion of each of the posts are aligned so that the working fluid is re-directed to flow in the cooling passageway with laminar flow.

19. The system of aspect 17 or 18, wherein each of the posts comprises a tip at a distal end of the respective posts and a base at a proximate end of the respective posts, the tip positioned between the first wall and the second wall in the cooling passageway, and the base coupled with the second wall.

20. The system as in any of aspects 17-19, wherein each of the posts comprises a tip at a distal end of the respective posts and a base at a proximate end of the respective posts, the tip positioned in contact with the first wall, and the base coupled with the second wall.

What is claimed is:

1. A system comprising:
    a hot section component of a gas turbine;
    a dual wall included in the hot section component, the dual wall including a first wall and a second wall, the first wall and the second wall disposed adjacently to define a cooling passageway therebetween;
    the first wall formed to include a series of impingement apertures providing fluid communication between the cooling passageway and a source of cooling fluid external to the cooling passageway; and
    a series of posts, each post of the series of posts extending from the second wall toward a respective one of the series of impingement apertures to align a tapered portion of each of the posts with one of the respective impingement apertures, the posts sized and positioned to receive and direct a flow of fluid into the cooling passageway, wherein each of the posts comprises a tip at a distal end of the respective posts and a base at a proximate end of the respective posts, the tip positioned between the first wall and the second wall in the cooling passageway, and the base coupled with the second wall.

2. The system of claim 1, wherein a cross-sectional area of a base of each of the posts is greater than a cross sectional area of a tip of each of the posts, the base coupled with second wall, and one of the tip and a sidewall of the post aligned with the respective one of the series of impingement apertures.

3. The system of claim 2, wherein the sidewall is tapered between the tip and the base.

4. The system of claim 3, wherein the sidewall is a planar surface between the tip and the base.

5. The system of claim 3, wherein the sidewall is a curved surface between the tip and the base having a predetermined radius of curvature.

6. The system of claim 1, wherein each of the posts include a proximate end coupled with the second wall and a distal end axially positioned in alignment with a respective one of the impingement apertures.

7. The system of claim 1, wherein a shape of each of the posts is a cone, a polyhedron, a half sphere or a ramp positioned on the second wall opposite a respective impingement aperture included in the first wall.

8. The system of claim 1, wherein the series of impingement apertures are positioned in a first predetermined pattern, and the series of posts are positioned in a second predetermined pattern that matches the first predetermined pattern.

9. A system comprising:
    a first wall formed to include a plurality of impingement apertures;
    a second wall that includes a plurality of posts; and
    a cooling passageway defined by the first wall and the second wall;
    the first wall aligned with the second wall such that each of the impingement apertures are positioned opposite one of respective posts;
    each of the posts extending away from the second wall into the cooling passageway toward the first wall to align a tapered portion of each of the posts with one of the respective impingement apertures, and the impingement apertures in fluid communication with the cooling passageway, wherein each of the posts comprises a tip at a distal end of the respective posts and a base at a proximate end of the respective posts, the tip positioned between the first wall and the second wall in the cooling passageway, and the base coupled with the second wall.

10. The system of claim 9, wherein each of the posts are in fluid communication with a working fluid received from respective outlets of the impingement apertures and the tapered portion of each of the posts are aligned so that the working fluid is re-directed to flow in the cooling passageway with laminar flow.

11. A system comprising:
a first wall formed to include a plurality of impingement apertures;
a second wall that includes a plurality of posts; and
a cooling passageway defined by the first wall and the second wall;
the first wall aligned with the second wall such that each of the impingement apertures are positioned opposite one of respective posts;
each of the posts extending away from the second wall into the cooling passageway toward the first wall to align a tapered portion of each of the posts with one of the respective impingement apertures, and the impingement apertures in fluid communication with the cooling passageway, wherein each of the posts comprises a tip at a distal end of the respective posts and a base at a proximate end of the respective posts, the tip positioned in contact with the first wall, and the base coupled with the second wall.

* * * * *